United States Patent [19]
Shinada

[11] Patent Number: 5,822,288
[45] Date of Patent: Oct. 13, 1998

[54] POWER SAVING METHOD AND APPARATUS FOR INTERMITTENTLY READING REPRODUCTION APPARATUS

[75] Inventor: Akira Shinada, Kanagawa, Japan

[73] Assignee: Sony Corporation, Tokyo, Japan

[21] Appl. No.: 534,096

[22] Filed: Sep. 22, 1995

Related U.S. Application Data

[63] Continuation of Ser. No. 88,674, Jul. 7, 1993, abandoned.

[30] Foreign Application Priority Data

| Jul. 9, 1992 | [JP] | Japan | 4-204231 |
| Feb. 5, 1993 | [JP] | Japan | 5-040738 |

[51] Int. Cl.⁶ ........................................... G11B 7/00
[52] U.S. Cl. .................... 369/54; 369/48; 369/60
[58] Field of Search ................... 369/47, 48, 51, 369/54, 124, 50, 53, 60; 358/342; 360/27, 32, 36.2, 69, 61, 62; 395/750, 550, 250

[56] References Cited

U.S. PATENT DOCUMENTS

| 4,495,609 | 1/1985 | Russell | 369/44 |
| 4,536,864 | 8/1985 | Van Rosmalen | 369/44 |
| 4,796,123 | 1/1989 | Takeuchi et al. | 360/10.1 |
| 4,796,247 | 1/1989 | Vogelsang | 360/44 |
| 4,982,390 | 1/1991 | Tanaka | 369/30 |
| 4,984,103 | 1/1991 | Nigam | 360/74.1 |
| 5,014,136 | 5/1991 | Sakai et al. | 358/341 |
| 5,032,930 | 7/1991 | Suetaka et al. | 358/342 |
| 5,034,827 | 7/1991 | Fukatsu et al. | 360/10.3 |
| 5,070,419 | 12/1991 | Kiyonaga | 360/72.2 |
| 5,140,571 | 8/1992 | Nishida et al. | 369/44.11 |
| 5,212,678 | 5/1993 | Roth et al. | 369/60 |
| 5,214,631 | 5/1993 | Maeda et al. | 369/59 |
| 5,224,087 | 6/1993 | Maeda et al. | 369/54 |
| 5,224,089 | 6/1993 | Matsumura et al. | 369/124 |
| 5,243,587 | 9/1993 | Itoh et al. | 369/48 |
| 5,289,440 | 2/1994 | Bakx | 369/32 |
| 5,291,467 | 3/1994 | Ishiwata et al. | 369/44.28 |
| 5,317,553 | 5/1994 | Ohga et al. | 369/54 |
| 5,418,762 | 5/1995 | Kitayama | 369/13 |
| 5,440,529 | 8/1995 | Takezawa et al. | 369/13 |
| 5,442,608 | 8/1995 | Umeda et al. | 369/44.27 |

FOREIGN PATENT DOCUMENTS

| 0 155 970 | 9/1984 | European Pat. Off. . |
| 0 138 246 A2 | 4/1985 | European Pat. Off. . |
| 0 196 590 | 3/1986 | European Pat. Off. . |
| 0 249 781 | 5/1987 | European Pat. Off. . |
| 0 283 727 | 2/1988 | European Pat. Off. . |
| 0 429 139 A1 | 11/1990 | European Pat. Off. . |
| 0 465 053 A2 | 1/1992 | European Pat. Off. . |
| 0 485 234 A2 | 5/1992 | European Pat. Off. . |
| 2 317 726 | 6/1975 | France . |
| 1 560 494 | 2/1980 | France . |
| 3296927 | 12/1991 | Japan . |
| 5089469 | 9/1993 | Japan . |
| 2 136 192 | 9/1984 | United Kingdom . |
| 2 258 372 | 2/1993 | United Kingdom . |

*Primary Examiner*—Thang V. Tran
*Attorney, Agent, or Firm*—Limbach & Limbach, LLP

[57] ABSTRACT

A reproducing or recording/reproducing apparatus having a constitution in which reproduced data read from a recording medium is stored in memory at a first transfer rate in a unit time and the stored data is read at a second transfer rate lower than the first transfer rate in the unit time. An operation of means for reading the reproduced data from the recording medium is stopped when an mount of the data accumulated in the storage means gets larger than a predetermined amount, allowing to save the power for driving the apparatus.

3 Claims, 12 Drawing Sheets

REMAINING DATA AMOUNT $D_R$

FIG. 4(a) DATA READ BUFFER RAM WRITE

FIG. 4(b) BUFFER RAM READ AUDIO OUTPUT

FIG. 4(c) REMAINING DATA AMOUNT

POWER SAVING METHOD AND APPARATUS FOR INTERMITTENTLY READING REPRODUCTION APPARATUS

This is a continuation of application Ser. No. 08/088,674 filed on Jul. 7, 1993, now abandoned.

BACKGROUND OF THE INVENTION

1. Field of the Invention

The present invention relates to an audio reproducing apparatus for reproducing data from, for example, a disc recording medium.

2. Description of the Related Art

It is known in the art that a reproducing-only apparatus or recording/reproducing apparatus on which a magneto-optical disc or an optical disc is operated for audio reproduction is required to operate on as small an electric power as possible for a longer playback time. This requirement is especially conspicuous with a portable, compact apparatus with its power supplied from an internally installed battery such as a dry battery or a rechargeable battery.

Meanwhile, U.S. Pat. No. 5,214,631 (Maeda, et al.) for example discloses a reproducing apparatus for reproducing data from a magneto-optical disc or an optical disc (such as a compact disc) wherein the data read from a recording medium through an optical head is temporarily stored in a buffer memory unit from which it is read at a predetermined timing to be converted into a reproduced audio signal.

In the above-mentioned constitution, a bit transfer rate at which the data read through the optical head is sent to the buffer memory is set to a higher level than a rate at which the data is read from the buffer memory. Consequently, the data is written to the buffer memory at a higher rate than it is read from the buffer memory, so that the buffer memory always holds a certain amount of data read through the optical head when the data is always read from the buffer memory. This allows to put out a reproduced audio signal without interruption even when the optical head is temporarily disabled by a track jump or the like caused by an external disturbance for example.

In the above-mentioned reproducing apparatus, the operation of the optical head and the operation of a signal system between the optical head and the buffer memory are performed intermittently so that the data is not supplied to the buffer memory in excess of an available write space in the buffer memory even when the data is written at a high transfer rate. While the data is not supplied to the buffer memory, the optical head is kept in a pause state. In the pause state, the optical head repeats a one-track jump operation to scan a same track until the amount of data in the buffer memory drops blow a predetermined level.

The duration of time in which the optical head is kept in the pause state, or a standby state, depends on a size of the buffer memory and settings of read/write transfer rates. For example, if a 74-minute magneto-optical disc is reproduced on an apparatus in which data is written to the buffer memory at a rate about five times as fast as it is read from it, the writing operation takes only one fifth of an actual overall reproducing time, or about 14 to 17 minutes in this example, keeping the optical head in the standby state in the remaining four fifths of the time. In other words, the optical head keeps repeating the one-track jump operation for the four fifths of the total reproducing time, wasting an electric power of the apparatus for a long time.

OBJECTS AND SUMMARY OF THE INVENTION

It is therefore an object of the present invention to provide an audio reproducing apparatus that operates longer than the related-art apparatus through an efficient power consumption realized by removing the wasted power consumption.

In carrying out the invention and according to one aspect thereof, there is provided, as a first constitution, an audio reproducing apparatus comprising data reading means for reading data from a storage medium, storage means for storing the reproduced data read by the data reading means, reproduced signal processing means for putting out, as a reproduced audio signal, the reproduced data read from the storage means, and control means for controlling operations of the data reading means and the storage means with a bit rate for reading the reproduced data from the storage means in a unit time set to a lower level than a bit rate for writing the reproduced data to the storage means in a unit time, wherein switch means for stopping or starting supply of an operating clock for a part or all of the data reading means is provided to be opened or closed by the control means according to an amount of the reproduced data in the storage means, controlling a power supply to a part of all of the data reading means.

In carrying out the invention and according to another aspect thereof, there is provided, as a second constitution, an audio reproducing apparatus comprising the same data reading means, storage means, reproducing signal processing means, and control means as those described in the above-mentioned first constitution with a bit rate for reading reproduced data from the storage means in a unit time set to a lower level than a bit rate for writing the reproduced data to the storage means, wherein the control means controls a supply of an operating command signal to a driving means according to an amount of the reproduced data in the storage means to start or stop an operation of the driving means for sending a drive signal to a driven portion in the data reading means.

In carrying out the invention and according to still another aspect, there is provided, as a third constitution, an audio reproducing apparatus comprising the same data reading means, storage means, reproduced signal processing means, and control means as those described in the above-mentioned first constitution with a bit rate for reading reproduced data from the storage means in a unit time set to a lower level than a bit rate for writing the reproduced data to the storage means, wherein switch means is provided for stopping a supply of power to driving means for sending a drive signal to a driven portion in the data reading means and the control means opens or closes the switch means according to an amount of the reproduced data in the storage means.

In an audio reproducing apparatus such as mentioned above which is provided with storage means as a buffer for reproduced output data with a bit rate for reading reproduced data from the storage means in a unit time set to a lower level than a bit rate for writing the reproduced data to the storage means in a unit time, a certain amount of data is always stored in the storage means during a reproducing operation while the data reading means is intermittently operated so that the data is not stored in the storage means more than is necessary. Therefore, the data reading means need not be operated except when the data is supplied to it.

Figure 1:
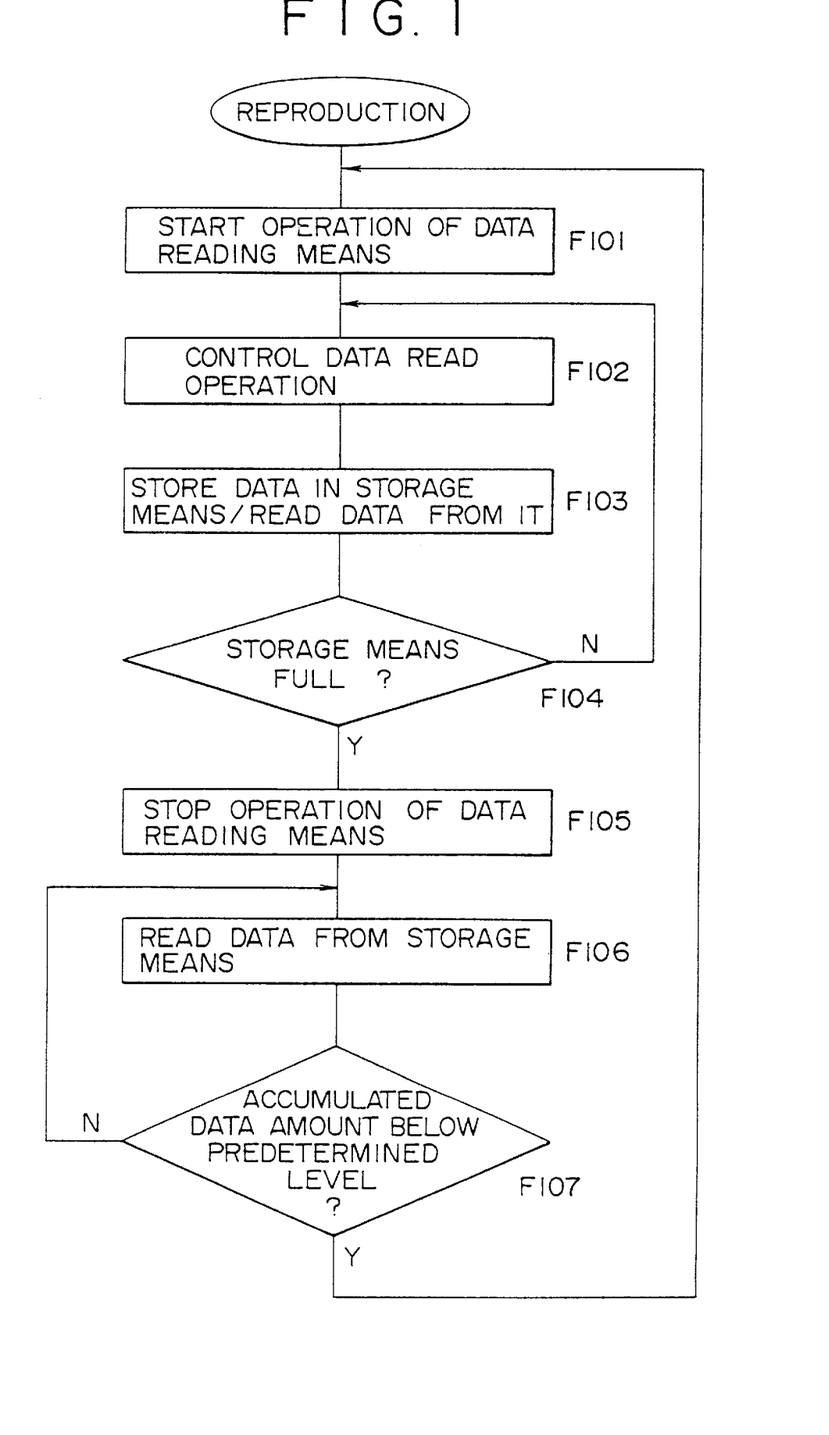
FIG. 1 is a flowchart of the conceptual operation of the audio reproducing apparatus according to the invention.

In other words, conceptually, executing operations shown in FIG. 1 can significantly save a power consumption of the audio reproducing apparatus.

In a reproducing operation, data is read in steps F101 and F102 of FIG. 1 to be written to the storage means while the data continuously read from the storage means is sent to the reproduced signal processing means to be put out as an audio signal in step F103, resulting in data accumulation because the data writing bit rate is higher than the data reading bit rate. When the data has been accumulated in the storage means to the full, the data reading means need not operate for a certain time, or until the data accumulation in the storage means drops below a predetermined level. This requires providing step F104 for determining whether the data has been fully accumulated in the storage means, step F105 for turning off the data reading means for a period of time until the accumulation drops below the predetermined level, step F106 for continuing the operation of reading data from the storage means and the operation of putting out the audio signal from the reproduced signal processing means, and step 107 for determining whether the data accumulation in the storage means has dropped below the predetermined level.

The above-mentioned constitution eliminates wasted power consumption caused by the unnecessary operation of the data reading means.

DESCRIPTION OF THE PREFERRED EMBODIMENTS

Figure 2:
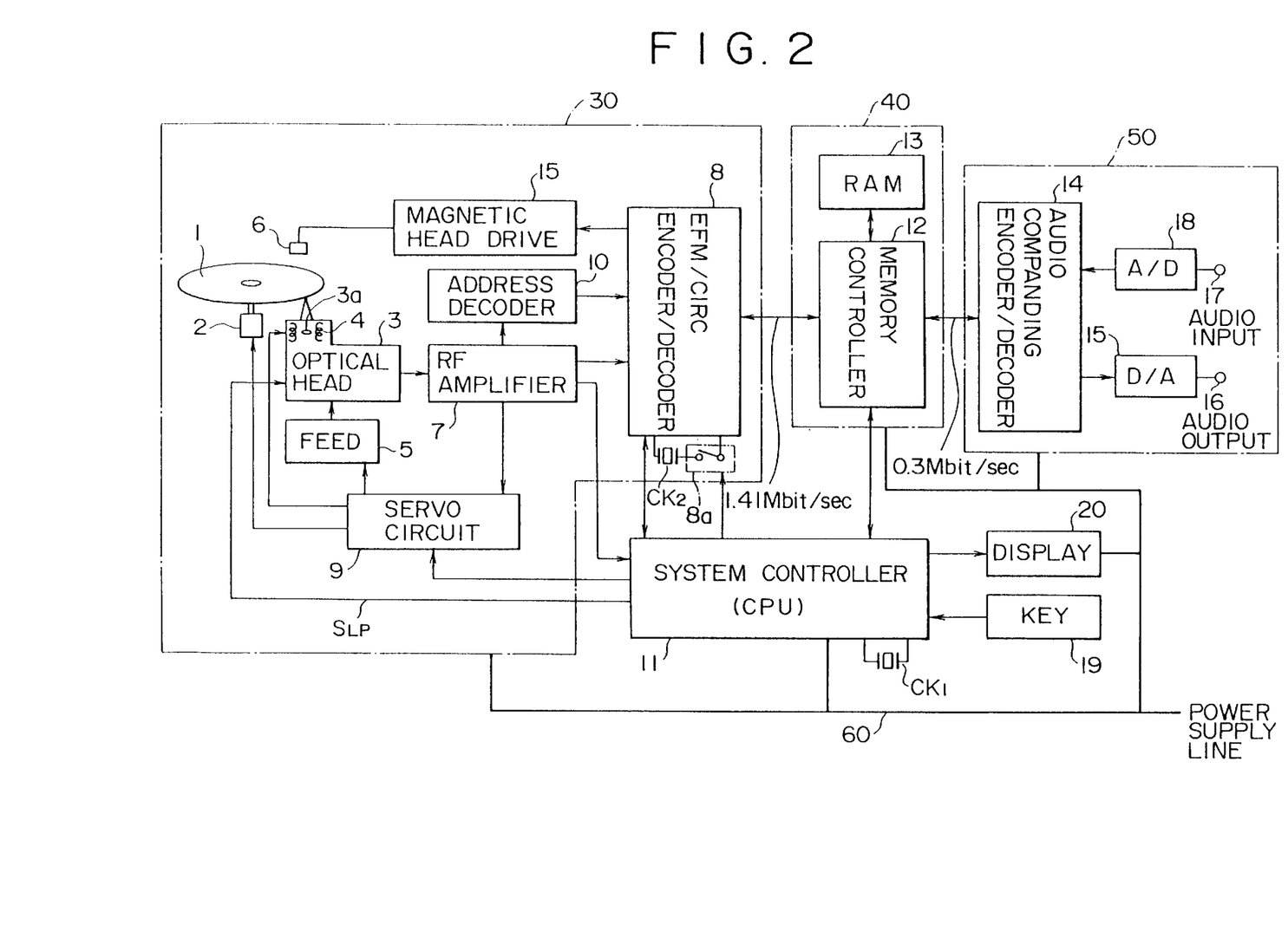
FIG. 2 is a block diagram illustrating a main portion of a first embodiment of the audio reproducing apparatus according to the invention.

Referring to FIGS. 2 through 6, there is shown a first embodiment of the audio reproducing apparatus according to the present invention. This embodiment is a recording/reproducing apparatus using a magneto-optical disc as storage medium. FIG. 2 is a block diagram illustrating a main portion of the recording/reproducing apparatus.

Referring now to FIG. 2, a system for transferring record/reproduction data with the magneto-optical disc in the recording/reproducing apparatus generally comprises a data read/write section 30 for reading/writing data on the magneto-optical data, a temporary storage 40 for storing data read from the magneto-optical disc or data to be written to it, and a record/reproduction signal processor 50 for performing audio companding and conversion between analog and digital signals.

Reference numeral 1 indicates the magneto-optical disc on which audio data is recorded for example. The disc is loaded into the data read/write section 30 to be rotationally driven by a spindle motor 2. Reference numeral 3 indicates an optical head through which a laser beam is radiated to the magneto-optical disc 1 at recording or reproducing data. At recording, it radiates a high-level laser for heating a recording track up to a Curie temperature; at reproducing, it radiates a laser of a relatively low level to detect data out of a reflected ray by magnetic Kerr effect.

For this purpose, the optical head 3 has a laser diode as laser output means, an optical system comprising a polarization beam splitter and an objective lens, and a detector for sensing the reflected beam. The objective lens 3a is displaceably held in directions radial and perpendicular to the disc 1.

Reference numeral 6 indicates a magnetic head which applies a magnetic field modulated by supplied data to the magneto-optical disc 1 and is arranged opposite to the optical head 3 with the disc in between. The entire optical head 3 and the magnetic head 6 are adapted to move beyond a displaceable range of the objective lens 3 in the direction radial to the disc by means of a feed mechanism 5.

Information detected from the magneto-optical disc 1 through the optical head 3 in a reproducing operation is sent to an RF amplifier 7. The RF amplifier 7 processes the information to extract a reproduced RF signal, a tracking error signal, a focus error signal, an absolute positional information (recorded on the magneto-optical disc 1 as a pregroup or wobbling group), an address information, and a focus monitor signal. The extracted reproduced RF signal is sent to an encoder/decoder 8. The tracking error signal and the focus error signal are sent to a servo circuit 9. The address information is sent to an address decoder 10. The absolute positional information and the focus monitor signal are sent to a system controller 11 comprising a microcomputer for example.

The servo circuit 9 generates various servo drive signals from the tracking error signal, the focus error signal, a track jump instruction and a seek instruction from the system controller 11, and rotational speed detection information from the spindle motor 2 to control the two-axis mechanism 4 and the feed mechanism 5 for focus and tracking control and maintains the spindle motor 2 at a constant angular velocity (CAV) or a constant linear velocity (CLV).

The reproduced RF signal is eight-to-fourteen modulated (EFM) by the encoder/decoder 8 and then demodulated to be put through decode processing such as CIRC (Cross Interleave Read-solomon Code). A resultant signal is sent to the temporary data storage 40, or temporarily written to a buffer RAM 13 through a memory controller 12. It should be noted that transfer of the data from the magneto-optical disc 1 through the optical head 3 to the buffer RAM 13, or the data transfer within the data read/write section 30, is performed at a rate of 1.41 Mbits/s and intermittently.

The data written to the buffer RAM 13 is read at a timing so that the reproduced data is transferred at a rate of 0.3 Mbit/s to be sent to the record/reproduction signal processor 50, or to an encoder/decoder 14. Then, the data is put through reproduced signal processing such as decoding for audio compression to be converted by a D-A converter 15 into an analog signal. The analog signal is fed from pin 16 to a predetermined amplifier to be put out as reproduction. For example, the analog signal is put out as left channel and right channel audio signals.

It should be noted that data read/write operations with the buffer RAM 13 are performed by addressing through a write pointer and a read pointer controlled by the memory controller 12.

Referring to FIGS. 3(a), 3(b), 3(c), and 3(d), data read/write operations with the buffer RAM 13 are conceptually shown supposing that addresses 0 through n are set for a data area in the RAM (actually, however, in addition to the audio signal data, the buffer RAM 13 holds TOC (Table Of Contents) data, which is information for controlling record/reproduction operations, so that a storage area other than for the audio signal data is also set in the RAM).

Figure 3A:
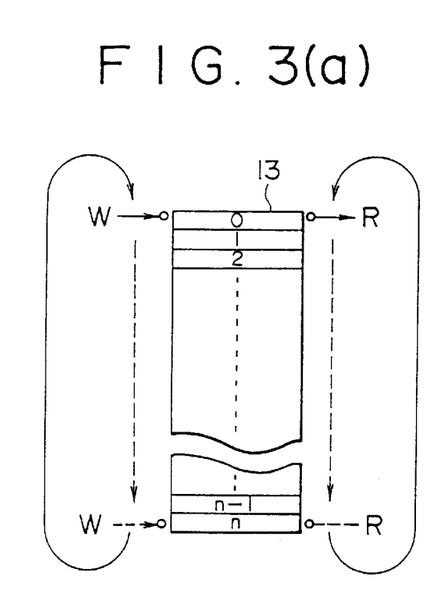
FIGS. 3(a), 3(b), 3(c), and 3(d) are a diagram illustrating a buffer RAM read/write operation of the embodiment.

As shown in FIG. 3(a), the write pointer W and the read pointer R are sequentially incremented for each of the addresses 0 through n and are reset to address 0 after reaching address n. This technique is known as ring control.

Figure 3B:
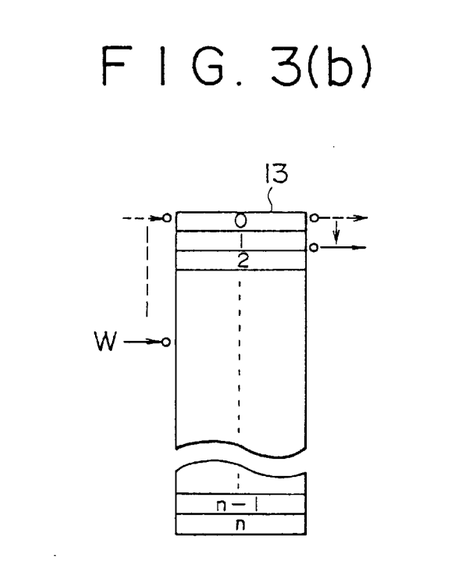

When the reproducing operation starts and the data is read from the magneto-optical disc through the data read/write section 30 to be stored in the data temporary storage 40, the write pointer W is sequentially incremented as shown in FIG. 3(b), writing the data to each address. At almost the same time (or at a time when the data has been accumulated to a certain extent), the read pointer is sequentially incremented, reading the data from each address to be sent to the encoder/decoder 14.

Figure 3C:
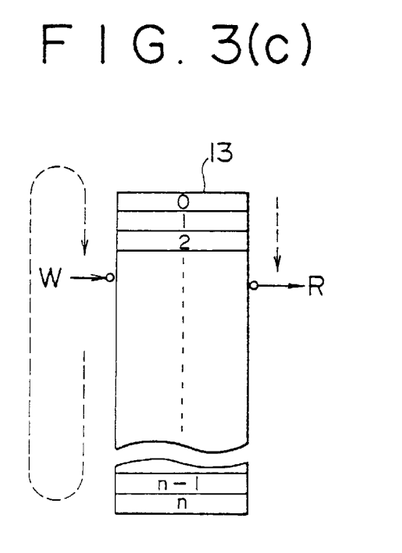

The write pointer W is incremented at the timing of 1.41 Mbits/s as mentioned above, while the read pointer R is incremented at the timing of 0.3 Mbit/s, having an address indicated by the write pointer W at a certain time catch up an address indicated by the read pointer R as shown in FIG. 3(c) (when the write pointer R indicates address x, the address indicated by the write pointer W is x−1). In other words, the buffer RAM 13 has been filled up with the data.

At this point of time, the write pointer W stops incrementing, making the data read/write section 30 stop reading data from the magneto-optical disc 1. Meanwhile, the read pointer R continues incrementing, putting out the reproduced audio signal without interruption.

Figure 3D:
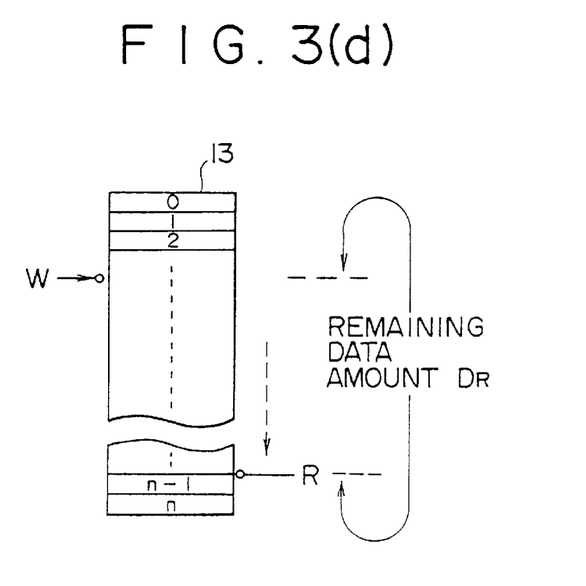

Then, only the operation of reading the data from the buffer RAM 13 continues. Now, suppose that a data accumulation DR in the buffer RAM 13 has dropped below a predetermined level at a certain point of time as shown in FIG. 3(d). When the predetermined level has been reached, the data read/write section 30 starts reading data and write pointer R starts incrementing. The reading operation continues until the address indicated by the write pointer W catches up with the address indicated by the read pointer R. Thus, the operation of the data read/write section 30 to write the reproduced data to the buffer RAM 13 is performed in an intermittent manner.

Figures 4A, 4B:
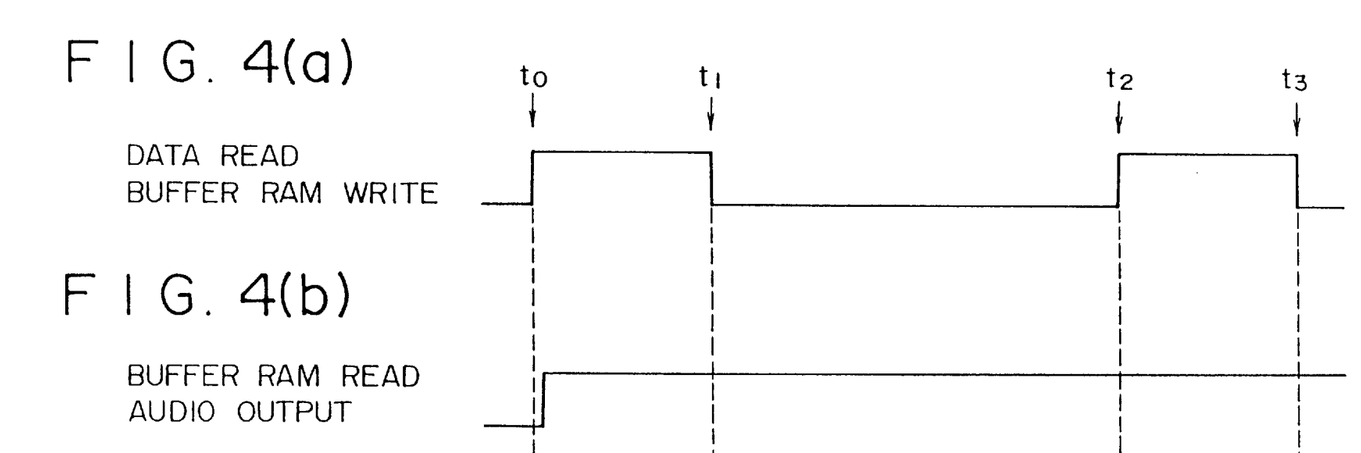
FIGS. 4(a), 4(b), and 4(c) are a diagram illustrating buffer RAM read/write timings of the embodiment.
Figure 4C:
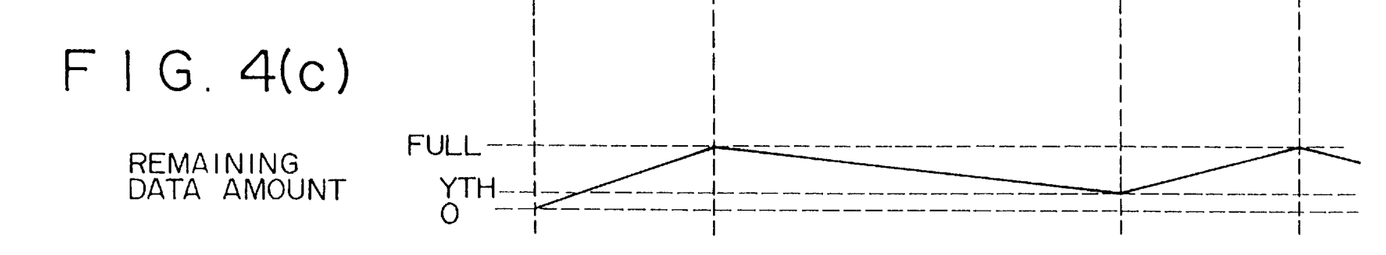

Referring to FIGS. 4(a), 4(b), and 4(c), a relationship of the above-mentioned operations is shown. Suppose that the reproducing operation starts at time t0. The data read/write section 30 starts reading data from the magneto-optical disc 1 to store it to the buffer RAM 13, immediately followed by operations for reading the data from the buffer RAM 13 and putting out it as a reproduced audio signal (FIGS. 4(a) and (b)). Then, if the data accumulation in the buffer RAM 13 has reached to a full level at time t1 (FIG. 4(c)), operations to read data from the magneto-optical disc and store it to the buffer RAM 13 are stopped. These operations will be not performed until time t2 when the data accumulation has dropped to a level indicated by YTH. When this level has been reached, the data read/write section 30 performs the data reading and storing operations from t2 to t3 at which the data accumulation reaches the full level.

Thus, putting out the reproduced audio signal through the buffer RAM 13 prevents the reproduced audio signal output from being interrupted by a tracking error caused by an external disturbance for example. If the tracking error occurs, a correct tracking position can be accessed while the data still remains in the RAM, starting the data reading operation without affecting the reproduced output. In other words, the novel setup significantly enhances anti-vibration performance of the audio recording/reproducing apparatus.

Referring again to FIG. 2, the address information and subcode data from the address decoder 10 are fed to the system controller 11 through the encoder/decoder 8 to be used for various control operations. Additionally, a lock detection signal of a PLL circuit for generating a bit clock for recording/reproducing operations and a monitor signal for checking whether a frame synchronization signal of the reproduced data (for right and left channels) is missing are fed to the system controller 11.

CK1 indicates a system clock generator. The system controller 11 performs control operations based on a clock generated by the CK1. A clock generator CK2 connected to the encoder/decoder 8 generates a clock for operating the data read/write section 30. It should be noted that a switch 8a implemented by an analog switch for example is provided to shut off an oscillation output from the clock generator CK2. The switch 8a is adapted to be opened or closed by the system controller 11.

Meanwhile, the system controller 11 generates a laser control signal SLP for controlling a operation of a laser diode installed on the optical head 3. This signal is used to turn on/off laser diode output and switch between output at reproduction when a laser power is relatively low and output at recording when it is relatively high while the laser diode output is on.

When a recording operation is performed on the magneto-optical disc, a recording signal (an analog audio signal) applied to a pin 17 is converted through a A-D converter 18 into digital data. The resultant digital data is then fed to the encoder/decoder 14 to be put through audio compression encoding processing. The recording data compressed by the encoder/decoder 14 is written to the buffer RAM 13 by the memory controller and then read from it at a predetermined timing to be fed to the encoder/decoder 8. The encoder/decoder 8 performs encoding processing such as CIRC and EFM on the recording data to send a resultant data to a magnetic head driver 15.

The magnetic head driver 15 supplies a magnetic head drive signal to the magnetic head 6 according to the encoded recording data. That is, the magnetic head 6 applies an N or S magnetic field to the magneto-optical disc 1. At the same time, the system controller 11 supplies the control signal to the optical head 6 so as to make it output a laser beam at the recording level.

Reference numeral 19 indicates an operator section. Reference numeral 20 indicates a display made up of a liquid crystal display for example. The operator section 19 has a reproduction key, a stop key, an AMS (Auto Music Scan) key, a search key, and the like.

Reference numeral 60 indicates a power supply line. A predetermined voltage is applied from an internally loaded battery not shown for example to each circuit over the power supply line 60.

A reproducing operation to be implemented by the embodiment having the above-mentioned constitution will be described with reference to the flowchart of FIG. 5 and the schematic diagram of FIG. 6.

Figure 5:
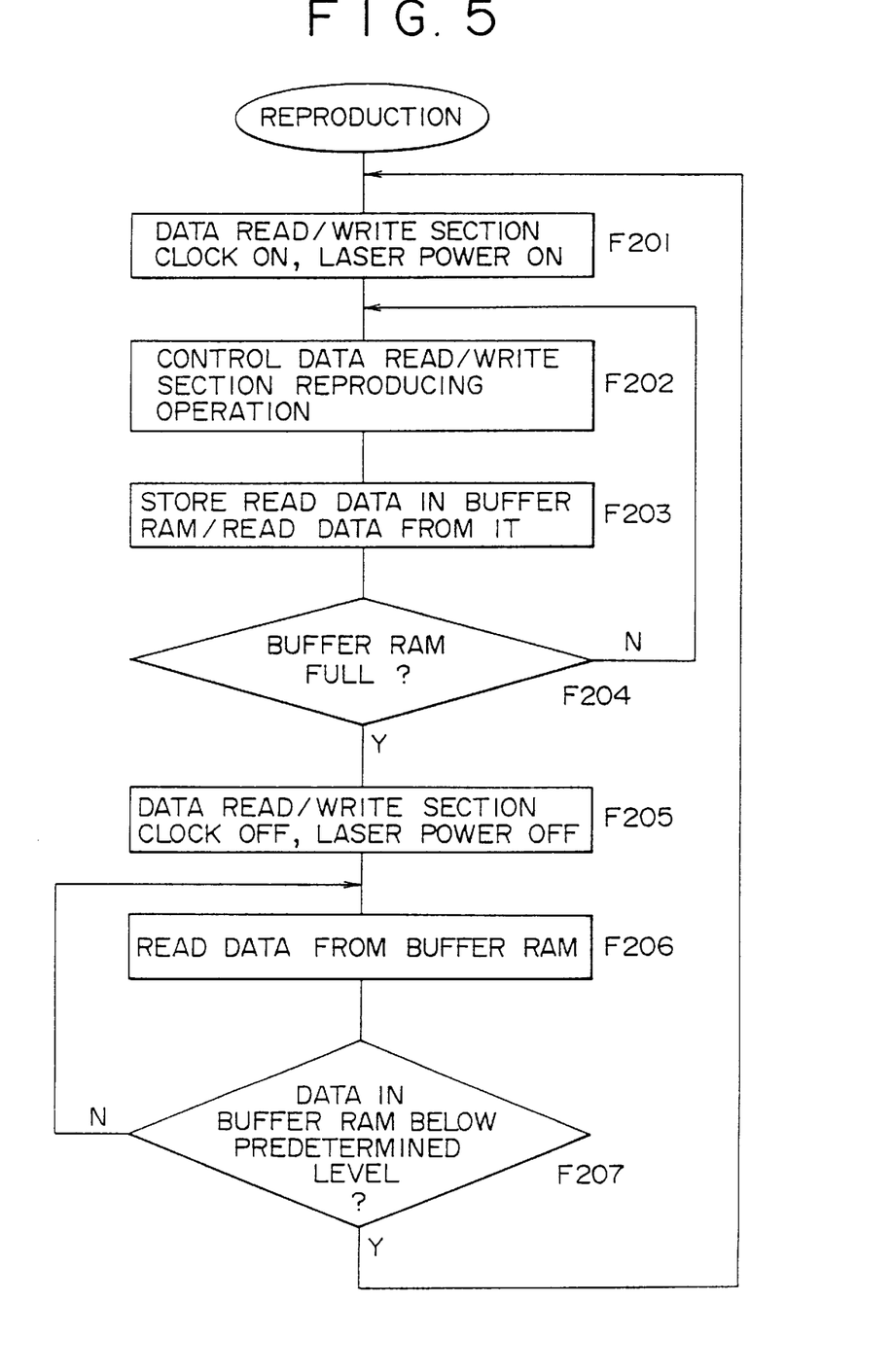
FIG. 5 is a flowchart of control to be performed at a reproducing operation of the first embodiment.

For example, when a user starts a reproducing operation by means of the operator section 19, reproduction of data recorded on the magneto-optical disc starts, activating the control operations shown in the flowchart of FIG. 5.

First, the data read/write section 30 must start operating. The system controller 11 controls the switch 8a in a closed state to allow a data reading operation based on the clock supplied from the clock generator CK2. Then, the system controller 11 makes the data read/write section 30 perform a reproduction initializing operation (F201). That is, the system controller 11 turns on the laser output (at the reproduction level) of the optical head, instructs the servo circuit to perform a focus search operation, and closes a focus servo loop when the two-axis mechanism 4 has been driven to reach a focusing range, turning on focus servo. The system controller 11 instructs the spindle motor 2 to start and controls its speed at a predetermined level. Then the system controller 11 turns on the tracking servo. When the above-mentioned initializing processing has been completed, data can be read from the magneto-optical disc. The system controller 11 then makes the data read/write section 30 perform a reproduced data reading operation (F202). In other words, a reproduced signal is extracted by the optical head 3. It should be noted that it takes about one to two seconds to complete the above-mentioned initializing operation.

In addition to performing the reproduced data reading operation in the data read/write section 30, the system controller 11 controls data write and read operations on the data temporary storage 40 through the memory controller 12 (F203). In other words, as mentioned above, the encoder/decoder 8 performs CIRC decode processing and EFM demodulation on the audio data extracted by the optical head 3. The resultant data is stored in the buffer RAM 13 at the rate of 1.4 Mbits/s and read from it at the rate of 0.3 Mbit/s. It is obvious that the difference between the data write rate and the data read rate causes a certain amount of data always to be left in the buffer RAM 13. If the buffer RAM 13 is 4 Mbits in storage size, the RAM holds the reproduced data for which it takes about ten seconds to read it all when full.

Figure 6A:
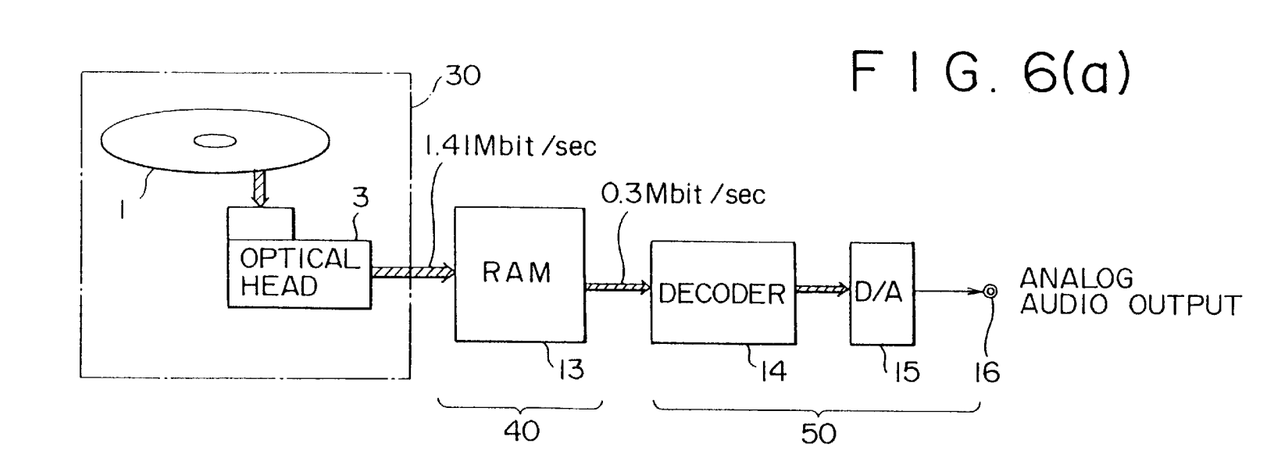
FIG. 6 is a diagram explaining a data transfer state at the reproducing operation of the embodiment.

During the reproducing operation, the read/write operations on the buffer RAM 13 are controlled as mentioned above to perform reproduction processing on the data read from the buffer RAM 13 by the encoder/decoder 14. The resultant data is then decoded into analog data to be put out from the pin 16 as an audio signal. FIG. 6(a) conceptually illustrates the flow of the reproduced data.

This operation repeats until the reproduced data is stored in the entire reproduced data storage area of the buffer RAM 13 (until time t1 of FIGS. 4(a), 4(b), and 4(c). That is, based on the information supplied from the memory controller 12, the system controller 11 detects the storage amount of the buffer RAM 18 to determine whether the reproduced data has been fully stored or not.

When the reproduced data is found to have been fully stored, the system controller 11 turns off the switch 8a to shut off the supply of the operating clock to each circuit of the data read/write section 30. At the same time, the system controller 11 turns off the laser power (F205). That is, all circuits of the data read/write section 30 stop operating and enter in a standby state.

Figure 6B:
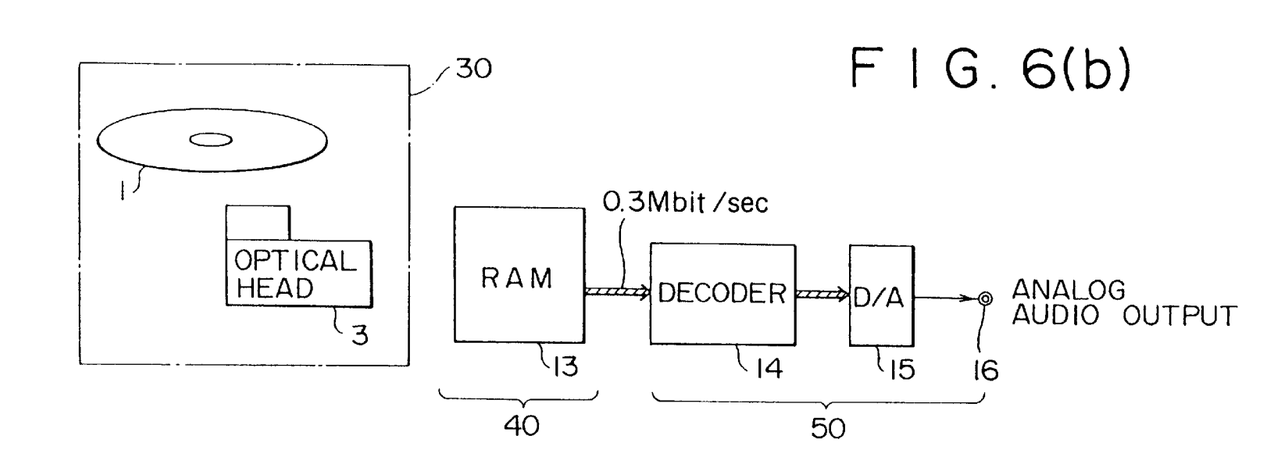

However, since the buffer RAM 13 stores the reproduced data for which it takes about ten seconds to read it all, the buffer RAM read operation continues (F206), providing audio output without interruption. The flow of the reproduced data is conceptually shown in FIG. 6(b).

Based on the information coming from the memory controller 12, the system controller 11 always knows the amount of the reproduced data stored in the buffer RAM 13, so that the system controller 11 compares the storage amount with a reference value such as, for example, a storage amount (YTH in FIGS. 4(a), 4(b), and 4(c)) for which it takes five seconds to read it all (F207). When the storage amount has dropped to a level at which it takes less than five seconds to read the remaining data, the system controller 11 turns on the switch 8a again to supply the operating clock. When the operating clock is supplied, the data read/write section 30 performs the initializing operation to access a predetermined track position, starting to read the reproduced data from a position at which the switch was turned off previously. It should be noted here that the access operation can be terminated quickly because the optical head has been positioned in proximity of the position at which the previous reading operation was stopped. Then, the reproduced data is written to the buffer RAM 13 at the high bit rate (F202 and F203). When the buffer RAM 13 is full, the supply of the clock to the data read/write section 30 is turned off again (F204 and P205).

Repeating the above-mentioned processing replaces the conventional pause state (between t1 and t2 in FIGS. 4(a), 4(b), and 4(c)) in the data read/write section 30 with the operation standby state of the data read/write section 30, allowing the recording/reproducing apparatus of the present embodiment to save the power consumed otherwise. Especially, when the data transfer rates and storage size are set as with the present embodiment, a power supply off period for the data read/write section 30 amounts to 4/5 of a reproduced audio signal output time to significantly save the power consumption, remarkably extending a service life of the internally loaded battery such as a dry cell or the like. For example, the apparatus of the present embodiment operates for more than two times an operational time of related-art apparatus.

Figure 7:
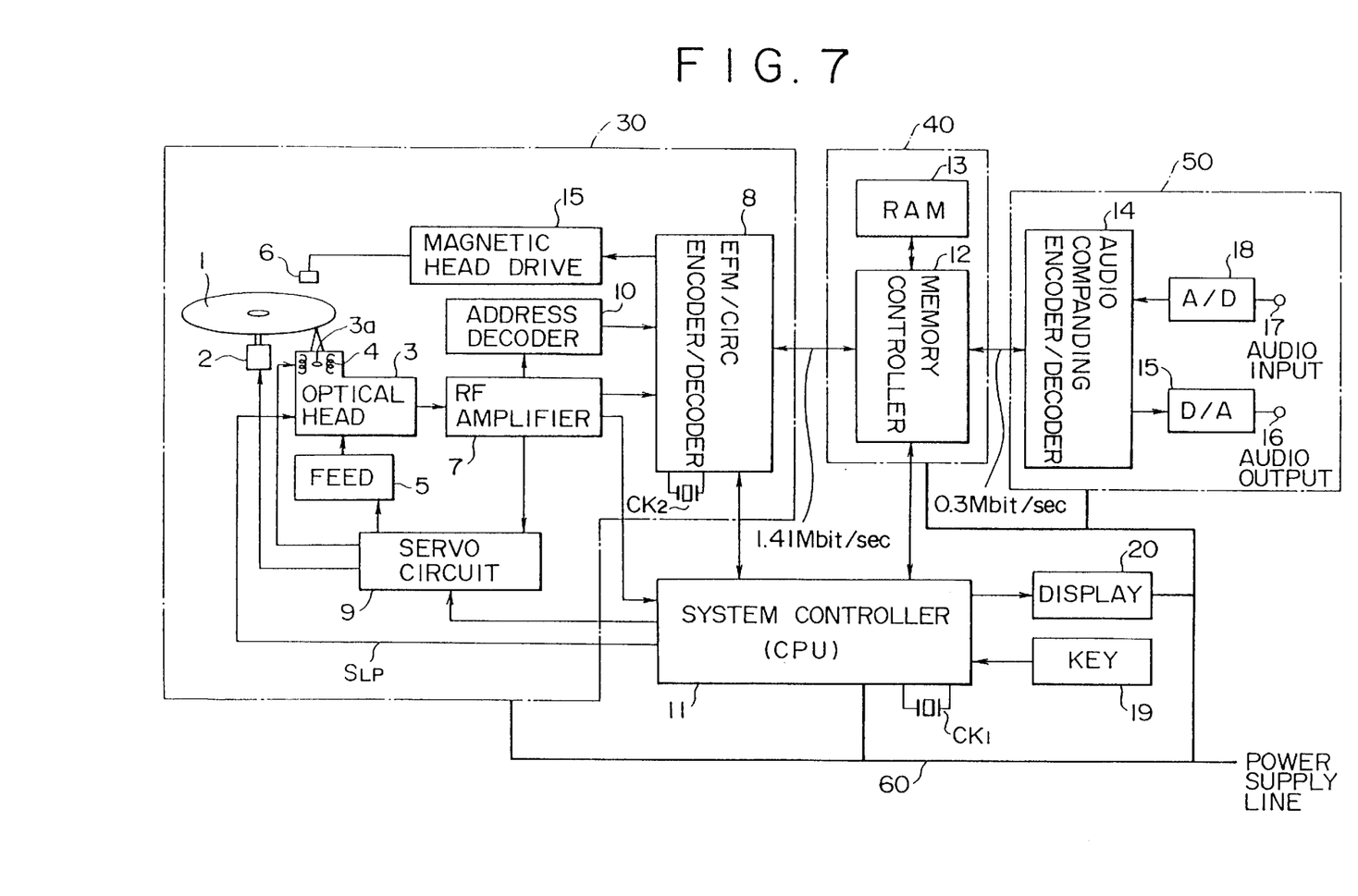
FIG. 7 is a block diagram illustrating a main portion of a second embodiment of the audio reproducing apparatus according to the invention.
Figure 8:
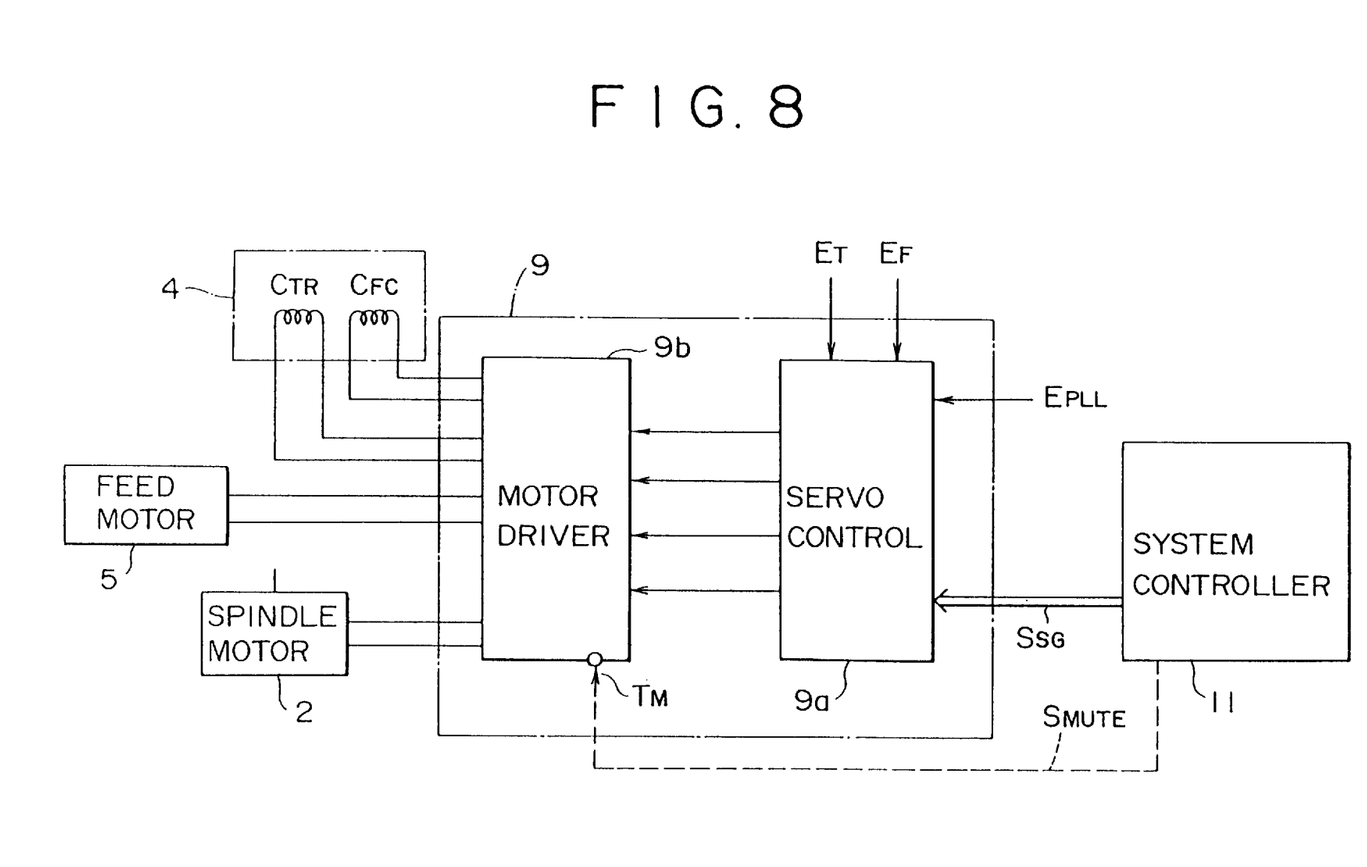
FIG. 8 is a diagram illustrating a servo system of the second embodiment.
Figure 9:
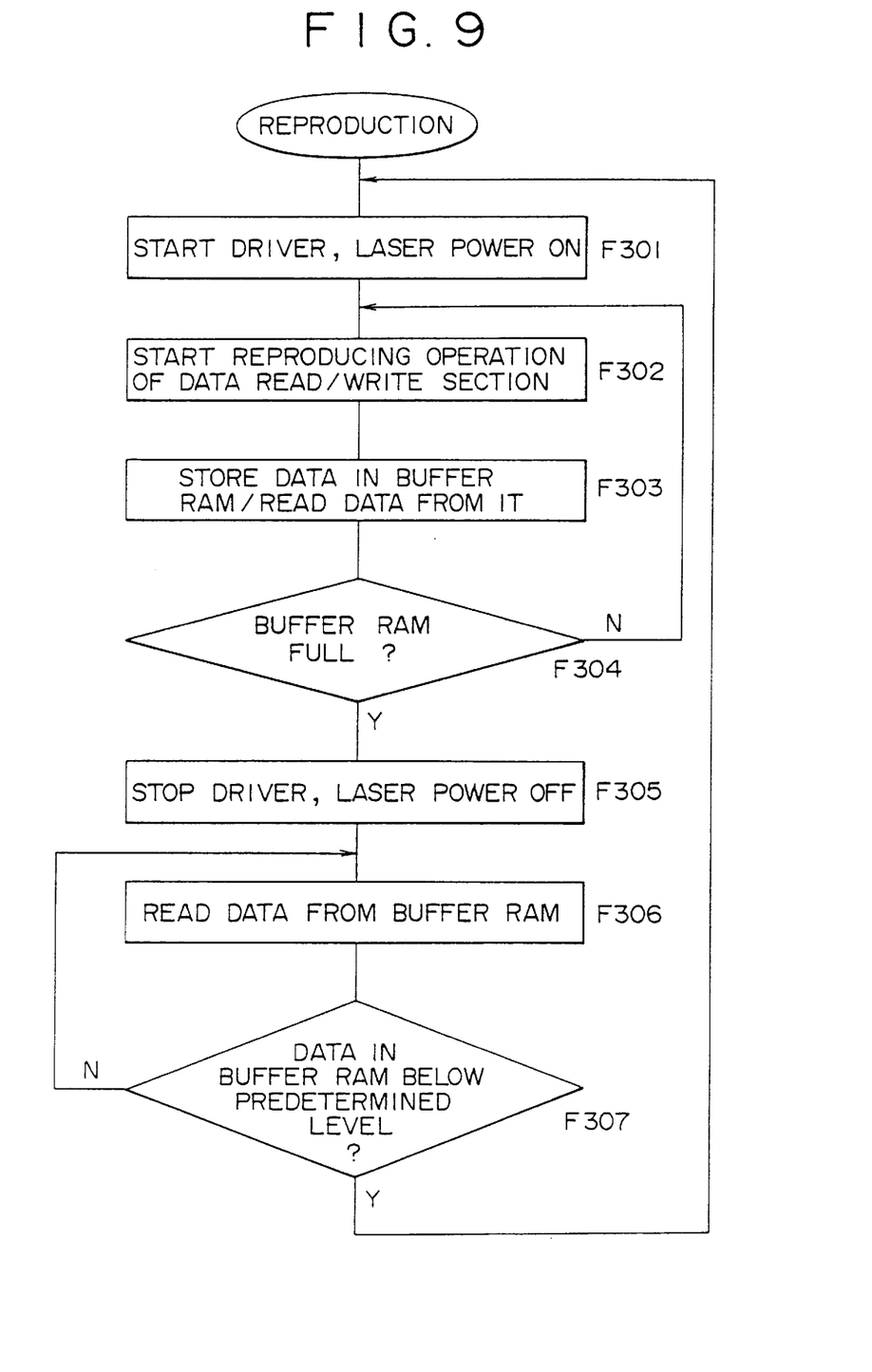
FIG. 9 is a flowchart of control to be performed at a reproducing operation of the second embodiment.

Referring now to FIGS. 7 through 9, there is shown a second embodiment of the audio reproducing apparatus according to the present invention. A constitution of this embodiment illustrated in FIG. 7 is almost the same as that illustrated in FIG. 2, so that description of each circuit block will be omitted. However, it should be noted that the switch 8a for shutting off the output of the clock generator CK2 as illustrated in FIG. 2 is not provided in the present embodiment. The servo circuit 9 and a driven portion in the data read/write section 30 in the present embodiment are constituted as shown in FIG. 8.

The servo circuit 9 is supplied with a tracking error signal ET, a focus error signal EF, and a spindle error signal EPLL as described before with respect to the first embodiment. It is also supplied with a control signal SSG from the system controller 11 for instructing servo execution, jump, or initializing operation. These signals are entered in a servo controller 9a to generate each of drive signals (tracking, focus, feed, and spindle) which are fed to a motor driver 9b.

To be controlled by the servo circuit 9 in an actual data reading operation taking place in the data read/write section 30 are a tracking coil CTR and a focus coil CFC in the two-axis mechanism 4, a feed motor 5, and the spindle motor 2. Based on the drive signals, the motor driver 9b supplies a drive power to each of these components. In the second embodiment, the system controller 11 performs a control operation at reproduction as shown in FIG. 9. It should be noted that F302, F303, F304, F306, and F307 in FIG. 9 are the same as F202, F203, F204, F206, and F207 in FIG. 5, so that duplicate description will be omitted.

In this embodiment, the system controller 11 instructs the servo controller 9a not to perform a motor driving operation during the period (between t1 and t2 in FIGS. 4(a), 4(b), and 4(c)) in which the data read/write section 30 need not operate. To be specific, in step F301, the system controller 11 turns on the laser power and supplies the servo execution control signal SSG to make the servo controller 9a perform a required operation and supply each drive signal to the motor driver 9b. During the period in which the data read/write section 30 need not operate, or the full data accumulation in the buffer RAM 13 drops to the predetermined level YTH, the system controller 11 suspends the servo execution control signal SSG (F305). Consequently, the servo controller 9a does not perform its operation with the drive signal not supplied to the motor driver 9b, putting each controlled section in a stopped state. At the same time, the laser power is turned off.

Consequently, this embodiment also solves the problem of the power consumption wasted during the period in which the data read/write section 30 need not operate, extending the battery service life as with the first embodiment.

If a circuit having a mute capability is used for the motor driver 9b in a variation of the second embodiment, the variation can be constituted so that the system controller 11 supplies a mute control signal SMUTE to the motor driver 9b as indicated by a dashed line during the period in which the data read/write section 30 need not operate.

Figure 10:
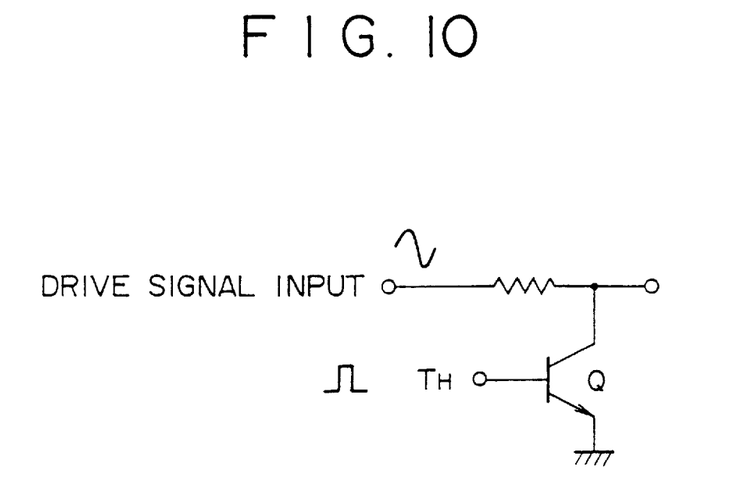
FIG. 10 is a diagram illustrating a mute capability of a variation of the second embodiment.

Referring to FIG. 10 as a circuit block diagram. The mute capability of the motor driver 9b is implemented by a switching element Q that can prevent an input drive signal from being put out. When the switching element Q is turned on by the mute control signal SMUTE entered from a mute pin TM, the drive signal is prevented from being put out. The technique also contributes to saving the power consumption.

Figure 11:
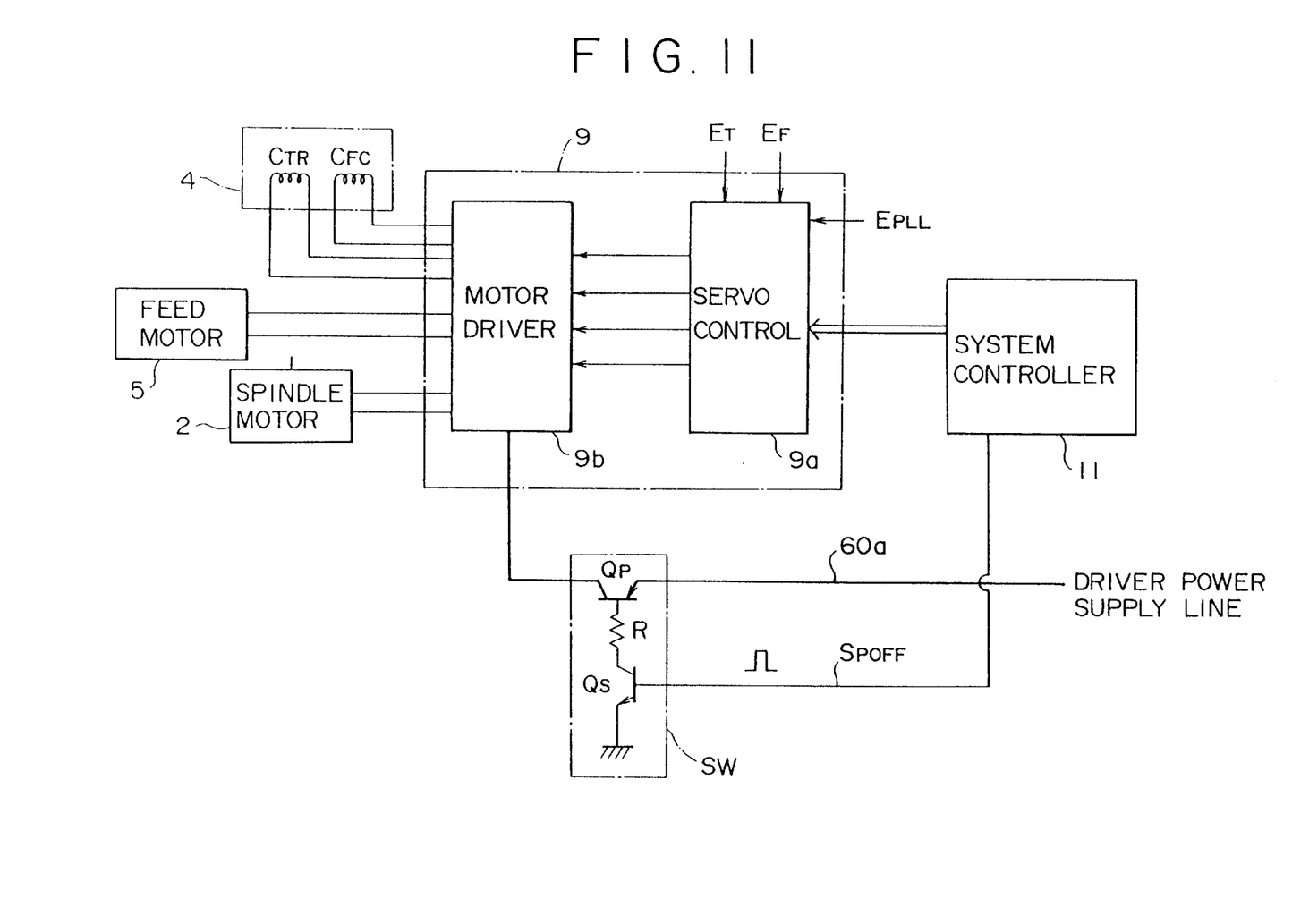
FIG. 11 is a diagram illustrating a servo system of a third embodiment of the audio reproducing apparatus according to the invention.
Figure 12:
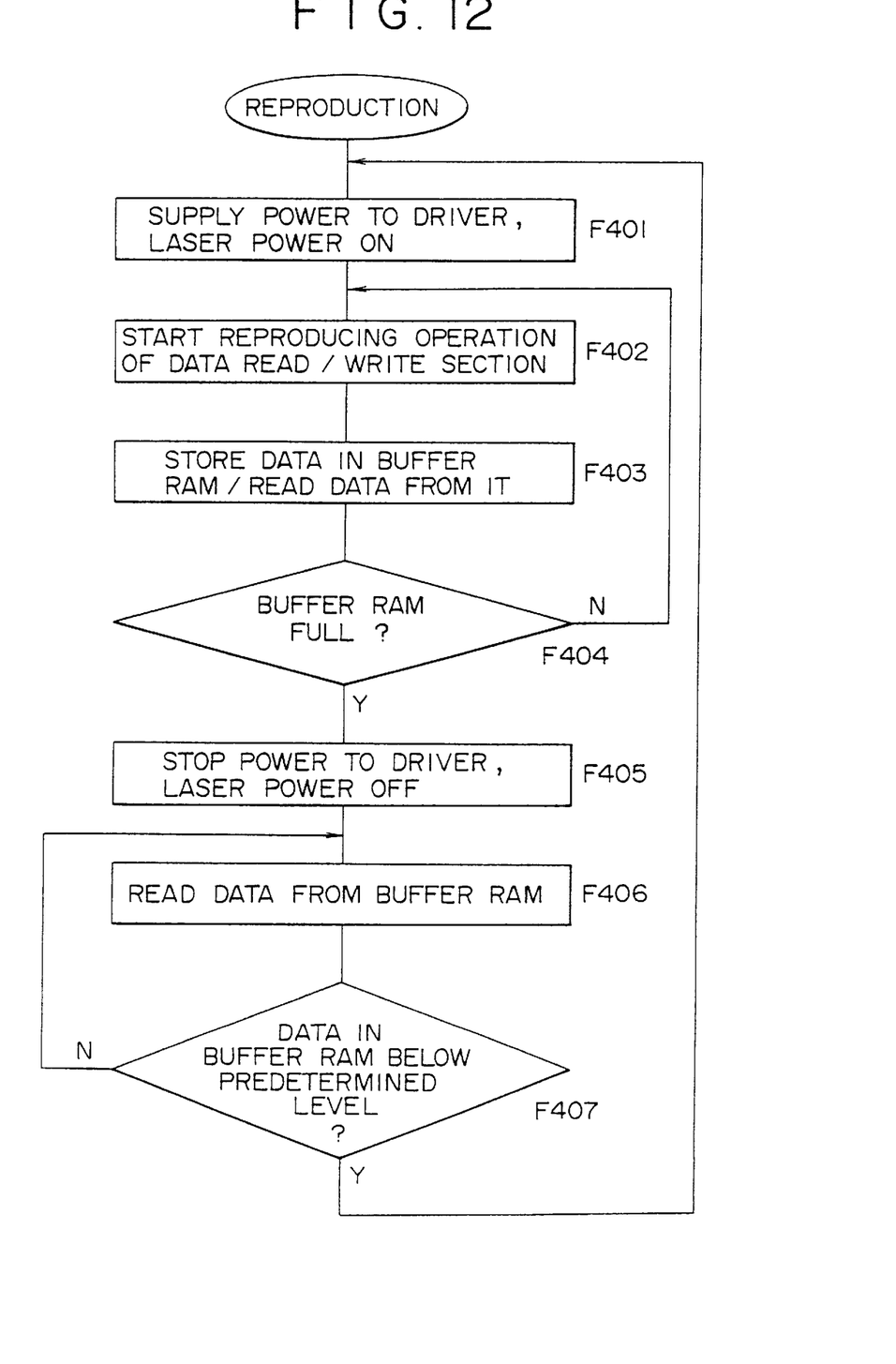
FIG. 12 is a flowchart of control to be performed at a reproducing operation of the third embodiment.

Referring to FIGS. 11 and 12, there is shown a third embodiment of the audio reproducing apparatus according to the present invention. Since a constitution of the third embodiment is the same as shown in FIG. 7, the description of each circuit block will be omitted. The servo circuit 9 and driven portion in the data read/write section 30 of this embodiment are constituted as shown in FIG. 11. This constitution is generally the same as with the second embodiment except a switch SW is provided on a power supply line 60a which supplies a power to the motor driver 9b.

The switch SW comprises a transistor QP, which is part of the power supply line, and a transistor QS to turn on/off the transistor QP. A switch control signal SPOFF is supplied from the system controller 11 to a base of the transistor QS. In other words, when the logic high-level switch control signal SPOFF is supplied to the transistor QS to conduct it, the transistor QP also conducts to shut off the power to the motor driver 9b.

In the third embodiment, the system controller 11 performs a control operation at reproduction as shown in FIG. 12. It should be noted that F402, F403, F406, and F407 in FIG. 12 are the same as F202, F203, F204, F206, and F207 in FIG. 5, so that duplicate description will be omitted.

This embodiment is also constituted so that no motor drive operation is performed during the period (between t1 and t2 in FIGS. 4(a), 4(b), and 4(c)) in which the data read/write section 30 need not operate. To be specific, subsequent to step F401, the system controller 11 does not supply the logic high-level switch control signal SPOFF to the transistor QS and turns on the laser output. Consequently, the motor driver 9b is properly powered to supply a drive power to the tracking coil CTR and focus coil CFC of the two-axis mechanism 4, the feed motor 5, and the spindle motor 2 based on each drive signal coming from the servo controller 9a. That is, a data reading operation is performed by the data read/write section 30.

However, during the period in which the data read/write section 30 need not operate, or the full data accumulation in the buffer RAM 13 drops to the predetermined level YTH, the system controller keeps supplying the logic high-level switch control signal SPOFF to the transistor QS to shut off the power line to the motor driver 9b (F405). This prevents the motor driver 9b from operating, putting each controlled portion in a stopped state. At the same time, the laser power is turned off. Consequently, this embodiment also solves the problem of the power consumption wasted during the period in which the data read/write section 30 need not operate, extending the battery service life as with the first embodiment.

It should be noted that the power supply shut-off may include power lines to other circuits of the data read/write section 30 than mentioned above. It should also be noted that the constitution of the switch SW is not restricted to that composed of transistors.

Meanwhile, in each of the above-mentioned embodiments, the setting value of the data accumulation by which the timing for restarting the operation of the data read/write section 30 is determined is not restricted to a half (5 seconds) of the full capacity as mentioned above. For example, if a high-speed initializing operation and a high-speed access are possible in the data read/write section 30, the timing for turning on the switch SW may be delayed (for example, the inactive state may be continued until the data accumulation drops to a level at which it takes four or three seconds to read all remaining data).

It will be apparent to those skilled in the art that each of the above-mentioned embodiments may be a reproduction-only apparatus rather than the recording/reproducing apparatus. It is also apparent that the present invention is applicable to a reproducing apparatus for an optical disc such as a compact disc (CD) or a digital audio tape (DAT) in addition to the magneto-optical disk. That is, the present invention is applicable to any reproducing apparatus constituted so that a buffer memory unit is provided at a rear stage of data reading means to always store a certain amount of data by fast reading the data from the CD or DAT.

While the preferred embodiments of the invention have been described using specific terms, such description is for illustrative purpose only, and it is to be understood that changes and variations may be made without departing from the spirit or scope of the appended claims.

What is claimed is:

1. A control method for any one of a reproducing apparatus and a recording/reproducing apparatus, comprising the steps of:

a) starting an operation of a decoder of a data reading means responsive to an instruction for reproduction;

b) controlling the operation of the decoder of the data reading means;

c) storing data read by the data reading means into a buffer memory means and reading the data therefrom;

d) comparing an amount of the data accumulated in the buffer memory means with a first predetermined amount;

e) stopping the operation of the decoder of the data reading means if, in step d), the amount of the accumulated data is determined to be greater than the first predetermined amount;

f) comparing the amount of the data accumulated in the storage means with a second predetermined amount, the second predetermined amount being smaller than the first predetermined amount; and g) returning to step a) if, in step f), the amount of the accumulated data is determined to be smaller than the second predetermined amount, wherein step a) comprises enabling reception of a clock signal by the decoder of the data reading means and turning on a laser power and wherein step e) comprises disabling reception of the clock signal by the decoder of the data reading means and turning off the laser power.

2. A control method for any one of a reproducing apparatus and a recording/reproducing apparatus, comprising the steps of:

a) starting an operation of a data reading means responsive to an instruction for reproduction;

b) controlling the operation of the data reading means;

c) storing data read by the data reading means into a buffer memory means and reading the data therefrom;

d) comparing an amount of the data accumulated in the buffer memory means with a first predetermined amount;

e) stopping the operation of the data reading means if, in step d), the amount of the accumulated data is determined to be greater than the first predetermined amount;

f) comparing the amount of the data accumulated in the storage means with a second predetermined amount, the second predetermined amount being smaller than the first predetermined amount; and g) returning to step a) if, in step f), the amount of the accumulated data is determined to be smaller than the second predetermined amount, wherein step a) comprises providing power to a driver, the driver for driving driven means, and turning on power to a laser of the data reading means, and wherein step e) comprises turning off power to the driver and turning off power to the laser.

3. A control method for any one of a reproducing apparatus and a recording/reproducing apparatus as defined in claim 2, wherein the driven means comprises at least any one or more of a focus coil, a tracking coil, a spindle motor, and a feed motor.

* * * * *